United States Patent [19]

Cheng

[11] Patent Number: 4,946,186
[45] Date of Patent: Aug. 7, 1990

[54] TELESCOPIC AND COLLAPSIBLE GOLF CART

[76] Inventor: Alex Cheng, No. 36, Lane 320, Sec. 2, Cheng kung Road, Taipei, Taiwan

[21] Appl. No.: 333,965

[22] Filed: Apr. 6, 1989

[51] Int. Cl.$^5$ .............................................. B62B 1/04
[52] U.S. Cl. ................................... 280/646; 280/655; 280/DIG. 6
[58] Field of Search ................... 280/DIG. 6, 42, 646, 280/652, 655, 39, 40

[56] References Cited

U.S. PATENT DOCUMENTS

| | | | |
|---|---|---|---|
| 2,806,708 | 9/1957 | Finstad | 280/655 |
| 3,400,943 | 9/1968 | Meiklejohn | 280/646 |
| 4,455,030 | 6/1984 | Rosén | 280/DIG. 6 X |
| 4,657,100 | 4/1987 | Lewis | 280/646 X |
| 4,784,401 | 11/1988 | Raguet | 280/DIG. 6 X |
| 4,848,504 | 7/1989 | Olson | 280/DIG. 6 X |

FOREIGN PATENT DOCUMENTS 870346  6/1961  United Kingdom ................ 280/655

*Primary Examiner*—Charles A. Marmor
*Assistant Examiner*—Brian L. Johnson
*Attorney, Agent, or Firm*—Bacon & Thomas

[57] ABSTRACT

A telescopic and collapsible golf cart includes a longitudinal frame member having ground supporting wheels, spaced bag cradle with respective straps a support frame and a handle connected thereto. The frame member is divided into three sections wherein a first section and a second section are pivotally and laterally interconnected by a hinge and adapted to be swung between a aligned position and a position parallel to each other. A third section is adapted to telescope within a hollow inner space of the second section of the frame member.

1 Claim, 6 Drawing Sheets

TELESCOPIC AND COLLAPSIBLE GOLF CART

BACKGROUND OF THE INVENTION

This invention relates to the design and construction of a golf cart for carrying a golf bag with clubs, and particularly to the design and construction of a telescopic and collapsible golf cart.

Currently, the golfer population is growing rapidly and golf carts are widely used on golf courses.

A known golf cart, as shown in FIG. 1, mainly has an upright frame member 11 of rectangular configuration. The lower end of the frame member 11 terminates in a support member 18 which extends upwardly from the frame member 11 for supporting a golf bag at the bottom. A pair of spaced bag cradles 16, 17 having respective cradle straps for tightening the golf bag thereon, are secured to the frame member 11.

A bracket means 15 is secured to the frame member 11 at a mid portion thereof. The bracket means 15 has lateral wings pivotally connecting two side beams 13 having ends to which axles (not shown) are mounted along a fixed transverse axis. Ground supporting wheels 14 are mounted to the axles for rotation about the fixed axis. A rectangular bracket means 19 is secured to the frame member 11 at an upper end and provided with a transverse pin across two opposed side walls extending rearwardly thereof.

A pull bar 10 has an upper end terminating in a handle 101 and a lower portion pivotally mounted on the transverse pin of the bracket means 19 so that the pull bar 10 can be swung between a pull position, as shown in FIG. 1, wherein the pull bar 10 can further be locked in position by means of a slide lock 100, and a folded position wherein the pull bar 10 is disposed under the frame member 11. The slide lock 100, as shown in FIG. 1A, can be a slide body which is slidably mounted on the upper end of the frame member 11 and adapted to slide through grooves in the lower end of the pull bar 10 so as to lock the pull bar in pull position.

It is found disadvantageous that the known golf cart can only be folded into a size that is not compact enough since the distance between the spaced bag cradles 16, 17 of the frame member 11 must be long enough to retain the gold bag in a stable manner. Moreover, the cart is not adjustable in height to accommodate user preference.

SUMMARY OF THE INVENTION

It is, therefore, an object of this invention to provide a telescopic and collapsible golf cart which is compact in telescoped and collapsed condition for facilitating packing or storage.

It is another object of this invention to provide a telescopic and collapsible golf cart which is adjustable in height to accommodate user preference.

With these objects in view, a telescopic and collapsible golf cart according to this invention includes a longitudinal frame member having ground supporting wheels, spaced bag cradles with respective cradle straps, a support frame and a handle connected thereto. The frame member is divided into three sections wherein a first section and a second section are pivotally and laterally interconnected by means of a hinge means and adapted to be swung between an aligned position and a position parallel to each other. A third section is adapted to telescope within a hollow inner space of the second section of the frame member.

It is a common requirement of the golfers to have a golf cart which can be folded into a compact size and stored in a tiny locker, closet, trunk of a car or hooked in a closet, garage, house, or even conveniently carried along holiday trips by air.

BRIEF DESCRIPTION OF THE DRAWINGS

A preferred form of the present invention is illustrated in the accompanying drawings in which.

DETAILED DESCRIPTION OF THE PREFERRED EMBODIMENT

Figure 1A:
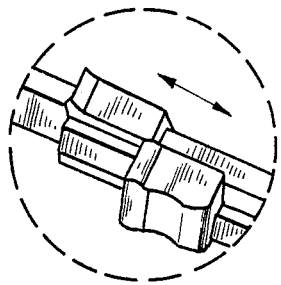
FIG. 1A is an enlarged view of the slide lock on the known golf cart shown in FIG. 1.
Figure 1:
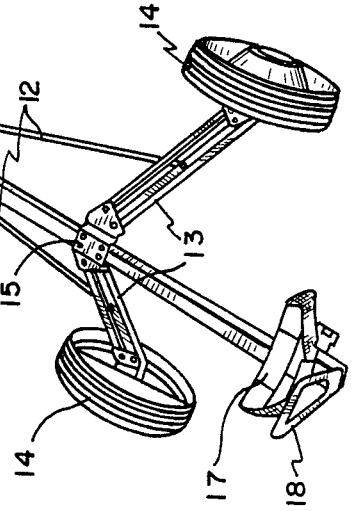
FIG. 1 is a perspective view of a known golf cart.
Figure 2:
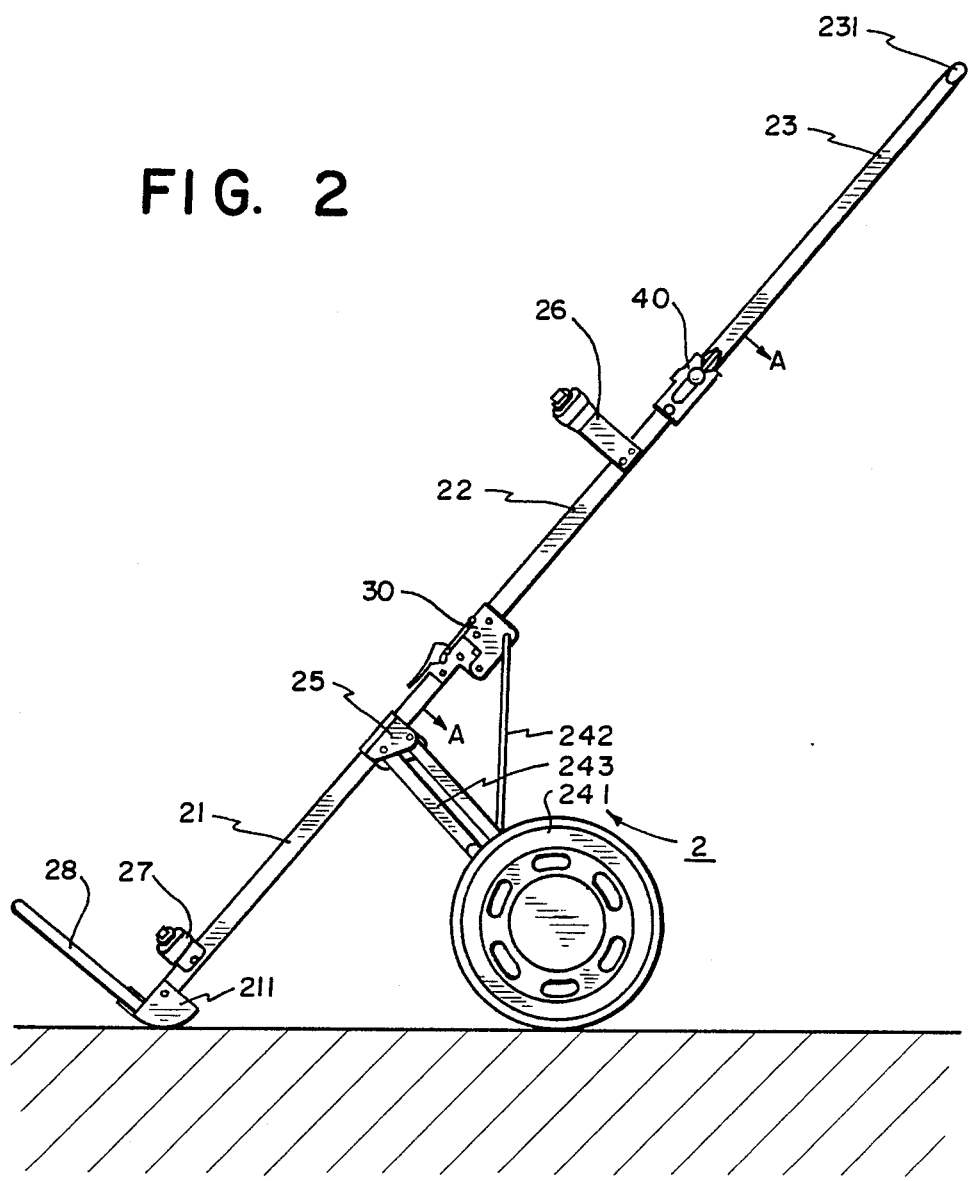
FIG. 2 is a side elevational view of a preferred embodiment of a golf cart according to this invention and shown in an extended condition.
Figure 3:
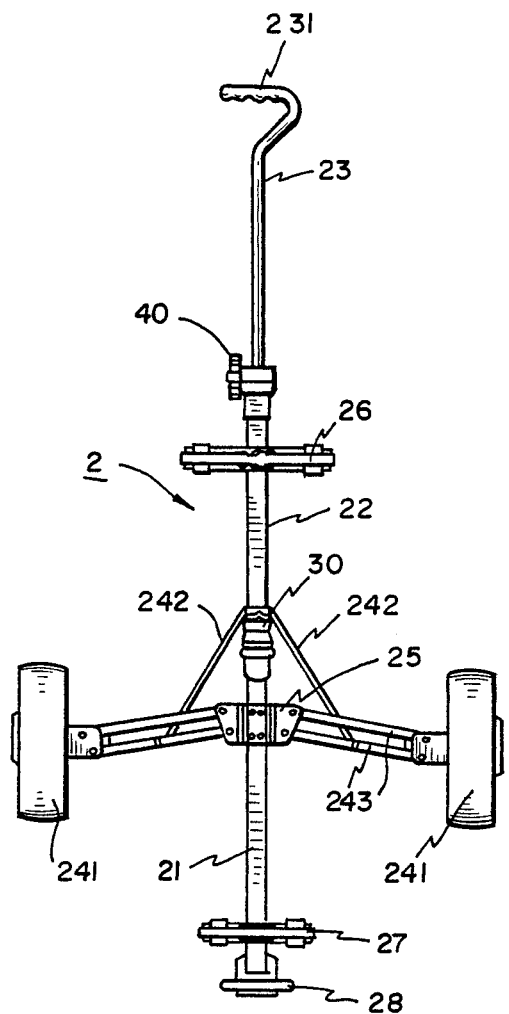
FIG. 3 is a top elevational view of the golf cart shown in FIG. 2.
Figure 8:
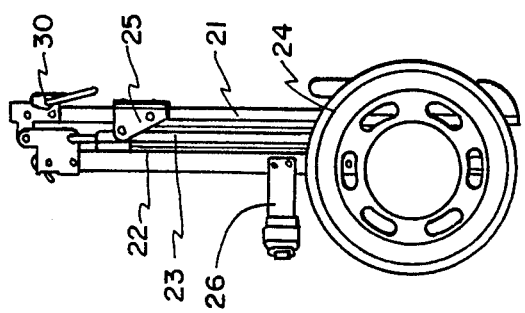
FIG. 8 is a side elevational view of the golf cart of this invention shown in a telescoped and collapsed condition.

Referring to FIGS. 2 & 3, a golf cart, which is gernerally indicated at 2, has a frame member which is divided into three sections 21, 22, 23. The first section 21 has a lower end terminating with a curved supporter 211 for ground support and an upper end connected with a lower end of the second section 22 through a hinge means 30. A first bag cradle 27 having cradle straps, is secured to the first section 21 at a lower end portion next to the ground supporter 211. A base plate or frame 28 has a lower end pivotally mounted on the ground supporter 211 so that the base frame 28 can be swung between an extended position, as shown in FIG. 2, perpendicular to the frame member for supporting a golf bag at a bottom thereof and a folded position, as shown in FIG. 8.

A bracket means 25 is secured to the first section 21 at an upper end portion next to the hinge means 30. The bracket means 25 has lateral wings pivotally connecting two side beams 243 to the ends of which axles (not shown) are mounted along a fixed transverse axis. Ground supporting wheels 241 are mounted to the axles for rotation about the fixed axis. A pair of links 242 pivotally interconnect the hinge means 30 at the second section 22 and respective beams 243 at mid portions thereof.

The second section 22 has a hollow inner space through the length and a screw lock 40 mounted on the upper end. A second bag cradle 26 having cradle straps and spaced from the first bag cradle 27 is secured to the second section 22 at an upper end portion next to the screw lock 40.

The third section 23 terminates with a handle 231 and is adapted to telescope within the second section 22. In addition, the third section 23 can be locked at any selected distance with respect to the second section 22 by means of the screw lock 40.

Figure 4:
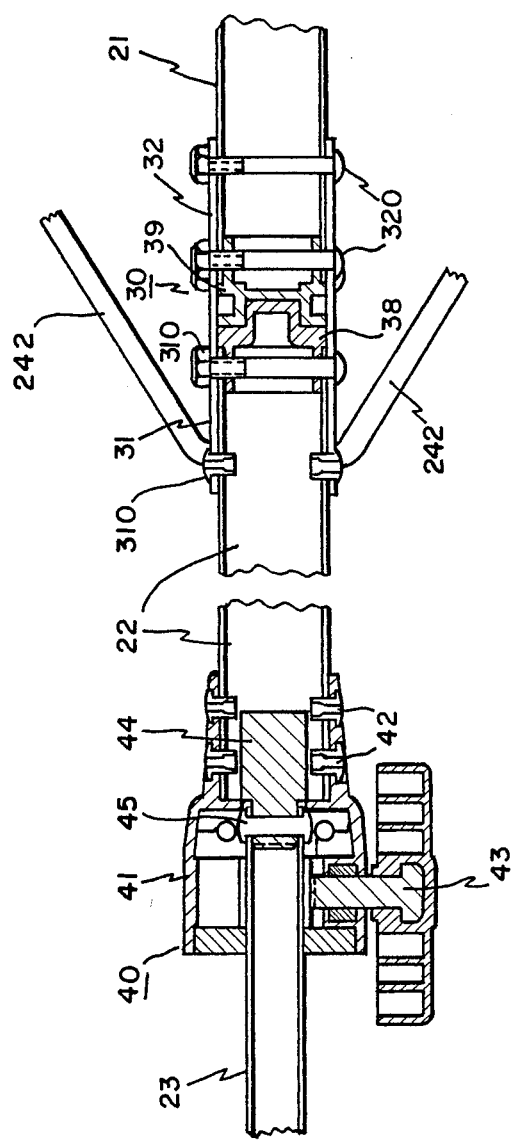
FIG. 4 is an enlarged cross-sectional view along line A—A shown in FIG. 2.

Referring to FIG. 4, the screw lock 40 includes a casing 41 secured to the upper end of the second section 22 by means of rivets 42, an inner threaded hole formed in a side wall of the casing 41 beyond the second section 22, a T-head bolt 43 having a thread adapted to be engaged with the inner thread of the hole so that the T-head bolt can be screwed inwardly through the hole, and a slider 44 connected to the lower end of the third section 23 by means of a rivet 45, sliding within the second section 22 in conjunction with the third section 23 which is to be positioned at various heights for user's preference as in usage by screwing inwardly the T-head bolt 43 of which a flat bottom end abuts against the third section 23.

The hinge means 30, as shown in FIGS. 4, 5, 6 & 7, includes a first bracket 32 secured to the upper end of the first section 21 by means of rivets or bolt and nut assemblies 320, one of which fixes a female coupler 39, a second bracket 31 secured to the lower end of the second section 22 by means of rivet and/or bolt and nut assembly 310, which fixes a male coupler 38 which, in turn, serves as a stopper for the slider 44, and a lock member generally indicated at 35. The first bracket 32 is integrally formed with a first projector 321 and a second projector 322 which are located in opposite sides thereof and extend laterally. The second bracket 31 is integrally formed with a side clevis 311 that is formed by a pair of parallel plates. A pin 33 pivotally connects the side clevis 311 of the second bracket 31 to the first projector 321 of the first bracket 32 for pivotal movement about a horizontal axis within an angle of at least 180 degrees.

The lock member 35 includes an arm 34 with one end pivotally connected to the second projector 322 by means of a pin 331 and a catch frame 36 made of wire with a lower cross beam pivotally and transversely secured in the arm 34 and spaced from the pin 331. A hook 37 is formed in a side wall of the second bracket 31 opposed to the side clevis 311.

Figure 7:
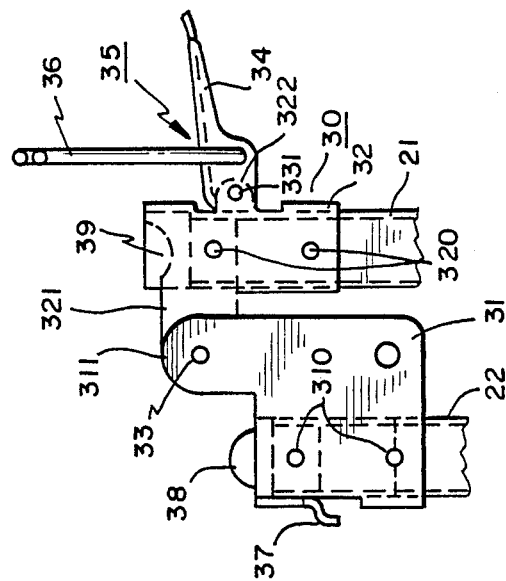
FIG. 7 is an enlarged side elevational view of the engaging means shown in a disconnected and folded condition.
Figure 6:
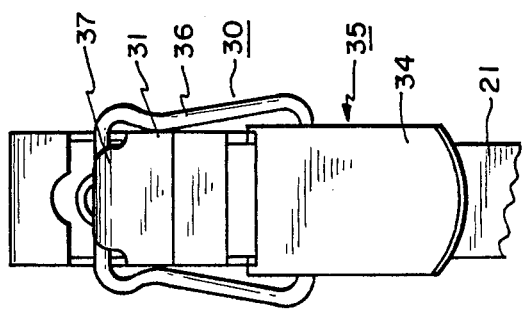
FIG. 6 is an enlarged top elevational view of the hinge means shown in FIG. 5.
Figure 5:
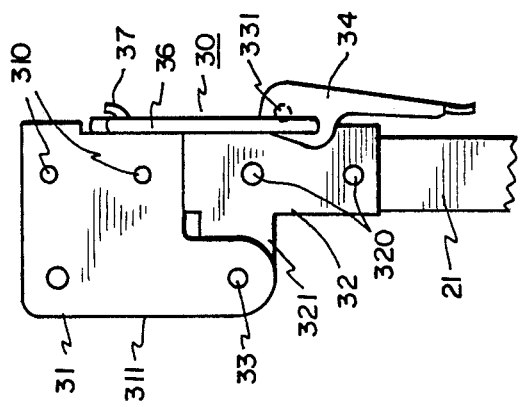
FIG. 5 is an enlarged side elevational view of a hinge means of the present invention shown in a connected and locked condition.

In operation, the first section 21 and the second section 22 can be joined in aligned position through the engagement of the male and female couplers 38, 39 and further locked in position by means of the lock member 35 when the upper cross beam of the catch frame 36 is inserted in the hook 37 and the arm 34 is swung in a clockwise direction about the pin 331 to draw back the catch frame 36 downwardly. On the contrary, the arm 34 can be swung counterclockwise to release the catch frame 36 out of the hook 37, thereby permitting the second section 22 to be swung counterclockwise into a position parallel to the first section 21, as shown in FIG. 7.

Figure 9:
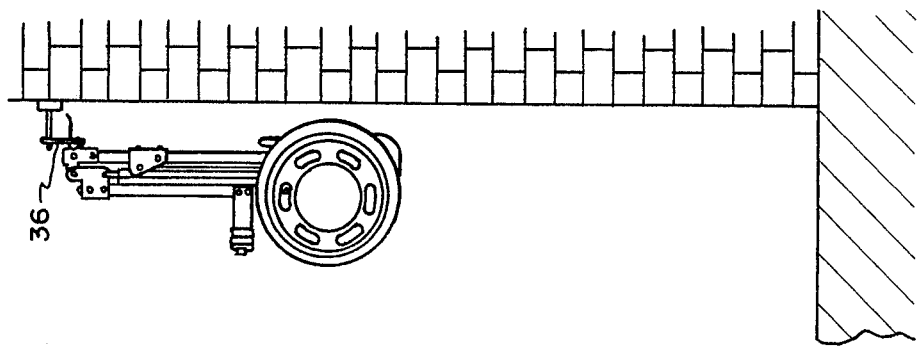
FIG. 9 is a diagramatic view of the golf cart shown telescoped, folded and further hooked for storage.

In folding the golf cart 2, the third section 23 of the frame member is first telescoped into the second section 22 with the handle 231 protruding therefrom. The second section 22 is then folded into a position parallel to the first section 21 while the wheels 241 are moved by the links 242 through the beams 243 simultaneously toward the lower portion of the first section 21 and toward each other in the same way as in a known golf cart. Finally, the base frame 28 is folded down towards the first section 21 and further retained by the straps of the first bag cradle 27 into the shape shown in FIG. 8. It will be noted that the telescoped and folded golf cart can be hooked by means of the catch frame 36, as shown in FIG. 9.

Various changes and modifications can be made in this construction without departing from the spirit of the invention or scope of the appended claims.

What is claimed is:

1. A telescopic and collapsible golf cart comprising:
   (a) a longitudinal frame member including a first section, a second section having a hollow inner space, and a third section terminating in a handle and telescopically receivable within the hollow inner space of the second section;
   (b) a base frame means pivotally connected to a lower end of the first section for swinging movement between a perpendicular position and a parallel position with respect to the first section;
   (c) a bracket means secured to the first section and including lateral wings, a side beam pivotally connected to each lateral wing, and a wheel rotatably mounted on each side beam;
   (d) a pair of spaced bag cradles secured to the first and second sections, and each cradle including strap means;
   (e) hinge means pivotally and laterally interconnecting an upper end of the first section to a lower end of the second section for permitting the first and second sections to be disposed in either a longitudinally aligned position or a parallel position with respect to each other, the hinge means including a first bracket secured to an upper end of the first section and a second bracket secured to a lower end of the second section, the first bracket including first and second projectors extending laterally from opposite sides thereof, the second bracket including a pair of parallel plates and a hook, a pin member pivotally connecting the parallel plates to the first projector, and first lock means including an arm having one end pivotally connected to the second projector and a catch frame secured to the arm for engaging the hook to lock the first and second sections in the longitudinally aligned position and for hanging the golf cart from a support means when the first and second sections are disposed in the parallel position;
   (f) a link member pivotally interconnecting each side beam to the hinge means; and
   (g) second lock means including a threaded bolt secured adjacent an upper end of the second section for selectively locking the third section in a desired telescopic position with respect to the second section.

* * * * *